United States Patent

Pucci

[11] Patent Number: 5,112,092
[45] Date of Patent: May 12, 1992

[54] APPARATUS FOR ELMINATION OF VEHICLE DOOR DENTS

[76] Inventor: Ricco D. Pucci, 3622 Kennington Ct., Huffman, Tex. 77336

[21] Appl. No.: 672,843

[22] Filed: Mar. 21, 1991

[51] Int. Cl.⁵ .............................................. B60R 19/42
[52] U.S. Cl. .................................... 293/128; 293/109; 293/118; 293/132; 280/770
[58] Field of Search ............... 293/109, 118, 120, 128, 293/132, 136, 142, 143; 296/136; 280/770

[56] References Cited

U.S. PATENT DOCUMENTS

| 3,610,684 | 10/1971 | Richter | 293/128 X |
| 3,704,037 | 11/1972 | Glassberg | 293/128 |
| 4,643,471 | 2/1987 | Fishback | 293/128 |
| 4,707,009 | 11/1987 | Barnett | 293/128 |
| 4,708,380 | 11/1987 | Cruz | 293/128 |
| 4,810,013 | 3/1989 | Spears | 293/128 |
| 4,810,015 | 3/1989 | McNeil | 293/128 |

FOREIGN PATENT DOCUMENTS 2564393  11/1985  France ................................ 293/128

Primary Examiner—Margaret A. Focarino
Assistant Examiner—Andrew C. Pike
Attorney, Agent, or Firm—Harrison & Egbert

[57] ABSTRACT

A removable apparatus for preventing abrasions, dents, and dings to the external surface of vehicle doors is provided. In a preferred embodiment of the present invention, composite layered padding is provided which is configured to be releasably received by a external surface of a vehicle door and disposed longitudinally thereof. A plurality of magnetic strips is contained within the padding, or a clamp or elastic strap is fixedly attached to the padding for sustaining the disposition thereof relative to the vehicle door. A cable fixedly attached on one end thereof to the padding is releasably attached at its other remote end to a top portion of a vehicle window for preventing the forcible removal of the padding therefrom. Substantially all potential abrasions, dents and dings to the exterior of a vehicle door are thwarted by impacts being absorbed by the padding.

17 Claims, 4 Drawing Sheets

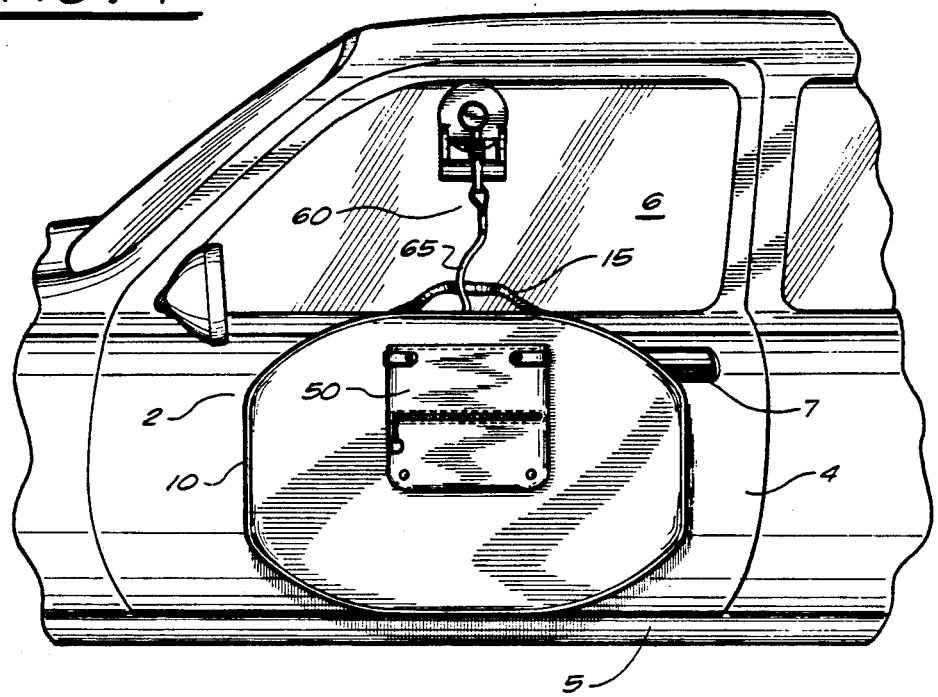
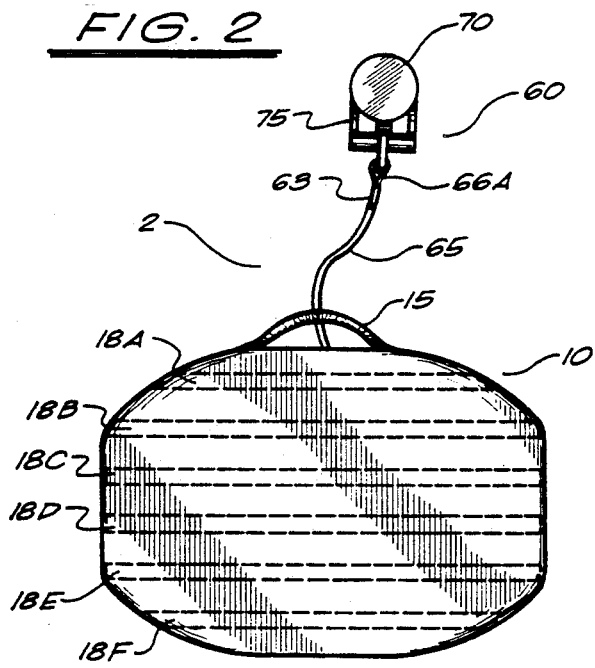
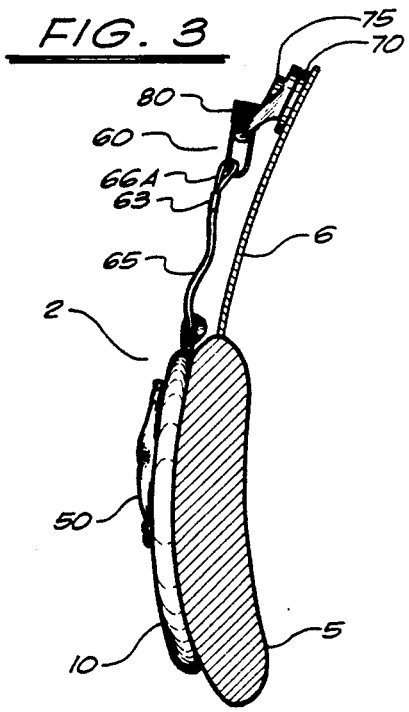

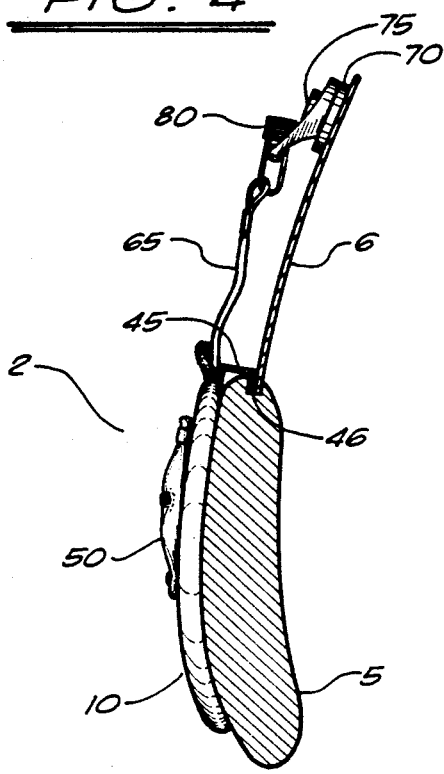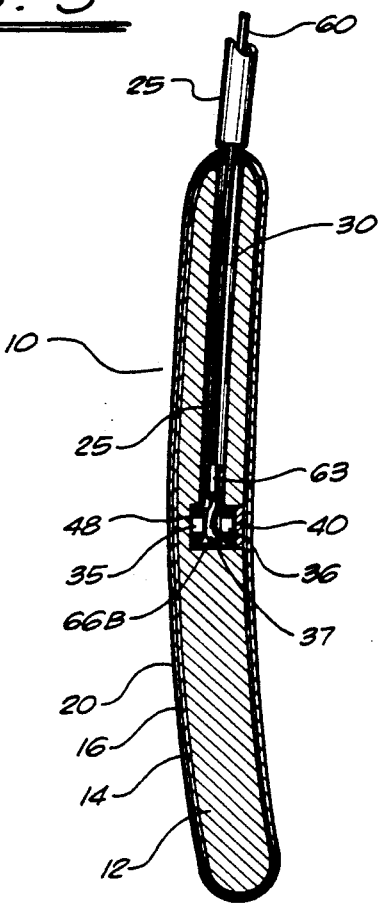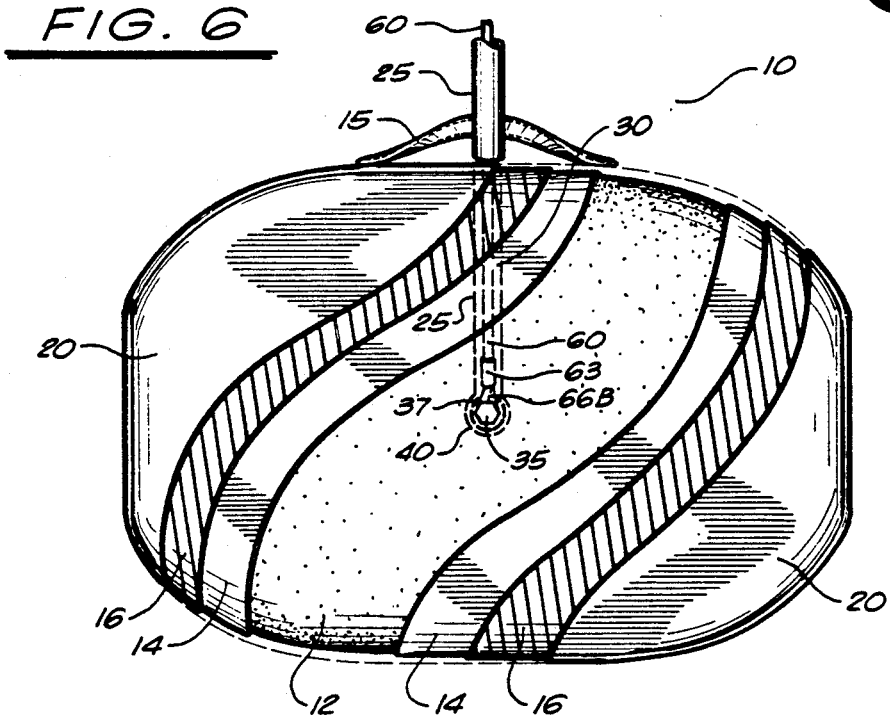

APPARATUS FOR ELMINATION OF VEHICLE DOOR DENTS

BACKGROUND OF THE INVENTION

This invention relates to methods and apparatus for automotive car care, and more particularly relates to methods and means for preventing damage to the external surface of vehicle doors and the like.

It is well known in the prior art that automobile doors are susceptible to being dented and otherwise scratched while parked in public places. There have been various vehicle door moldings and similar accessories developed to protect the trim thereof. But such moldings are clearly limited to offensively protecting door trim, not the body or surface of the door. In addition, the effectiveness of such moldings and the like depends upon the coordination between the trim-moldings of one car and the configuration of the surface of the door of another car. Under circumstances in which the height, size, and shape of doors of respective vehicles randomly placed adjacent each other, there is inadequate likelihood of such dent-preventative devices from being successful.

Accordingly, there has been a paucity of apparatus developed which may be conveniently placed upon and removed from vehicle doors and the like, in order to prevent them from being physically dented and damaged by being contacted by a door of another vehicle. Indeed, heretofore unknown in the prior art is an apparatus and technique for effectively protecting vehicle doors from being dented and scratched by enabling substantially all of the susceptible surface thereof to be protected by a removable covering. If it were feasible to easily attach such a protection to the susceptible lateral surfaces of a vehicle door and the like, the frequency of the deterioration of the surface thereof would be greatly reduced, thereby prolonging the aesthetics and integrity of the vehicle door.

Accordingly, these limitations and disadvantages of the prior art are overcome with the present invention, whereby means and techniques are provided which are useful for preventing dents and scratches to vehicle doors and the like.

SUMMARY OF THE INVENTION

The present invention provides an apparatus for preserving the aesthetics of a vehicle door and other lateral surfaces thereof, and for preventing damage thereto due to dents, dings and abrasions. The vehicle ding and dent prevention apparatus under the present invention, consists of padding means for cushioning purposes and a plurality of layers totally encasing it. These layers include an inner layer of preferably plastic wrap which contains the padding and is fixedly attached thereto and also being totally encased thereby and an outer layer consisting of preferably upholstery for protection and aesthetics. Preferably disposed between the inner and outer layers is at least one intermediate layer preferably consisting of fabric fixedly attached to and totally encasing the inner layer. Also provided is a securing means fixedly attached to the padding means for sustaining the attachment of the instant apparatus to a vehicle door.

In a preferred embodiment of the present invention, the intermediate fabric layer comprises a plurality of magnetic strips which are disposed longitudinally therein. These magnetic strips promote uninterrupted contact between the instant invention and a door exterior sought to be protected from dents and the like. Other embodiments provide such contact-promoting function by using clamps or elastic straps.

In accordance with the present invention, methods and means are provided to enable the surface of a vehicle door to be protected from dents, dings and abrasions.

In accordance with the present invention, methods and means heretofore unknown in the prior art are provided for preventing damage to vehicle doors, whereby an apparatus under the present invention may be conveniently and quickly installed after a vehicle is parked.

It is an object of the present invention to provide an apparatus which may accommodate any size or shape of vehicle door.

It is also an object of the present invention to provide an apparatus that may be configured to accommodate only a portion of the door or lateral portion of a vehicle.

It is a further object of the present invention to provide a method for safeguarding the structural integrity and aesthetics of a vehicle door when the vehicle is parked in close proximity to other vehicles.

It is a specific object of the present invention to provide, in a vehicle having a plurality of doors with windows, an apparatus for elimination of dents to an external surface of at least one of said doors, said apparatus comprising padding means having foam means and a plurality of layering means, said padding means configured to be releasably received by said external surface of said one door, and disposed longitudinally thereof; said layering means comprising an outer fabric layer fixedly attached to said foam means, an inner plastic wrap layer fixedly attached to and totally encasing said foam means for containment of said foam means, at least one intermediate fabric layer fixedly attached to and totally encasing said inner plastic wrap layer for protection of said inner plastic wrap layer, and an outer upholstery layer fixedly attached to and totally encasing said intermediate fabric layer for protection of said intermediate fabric layer and for aesthetics; and securing means fixedly attached to said padding means for sustaining a medial disposition of said securing means between said padding means and said external surface of said one door.

It is another specific object of the present invention to provide, in a vehicle having a plurality of doors with windows, an apparatus for elimination of dents to an external surface of at least one of said doors with a window, said apparatus comprising padding means having foam means and a plurality of layering means, said padding means configured to be releasably received by said external surface of said one door, and disposed longitudinally thereof; said layering means comprising an outer fabric layer fixedly attached to said foam means, an inner plastic wrap layer fixedly attached to and totally encasing said cushioning means for containment of said foam means, at least one intermediate fabric layer fixedly attached to and totally encasing said inner plastic wrap layer for protection of said inner plastic wrap layer, and an outer upholstery layer fixedly attached to and totally encasing said intermediate fabric layer for protection of said intermediate fabric layer and for aesthetics; said intermediate fabric layer comprising a plurality of magnetic strips disposed fixedly and longitudinally therein for attraction thereof to said external surface of said one door; securing means fixedly attached to said padding means for sustaining a medial disposition of said securing means between said padding means and said external surface of said one door; and cable means fixedly attached on one end to anchor means contained within said padding means and releasably attached on another end which is opposite and remote from the one end thereof to a portion of said one window of said one door, for preventing said padding means from being forcibly removed from said one door.

These and other objects and features of the present invention will become apparent from the following detailed description, wherein reference is made to the figures in the accompanying drawings.

IN THE DRAWINGS

FIG. 1 depicts a frontal perspective view of an apparatus embodying the present invention.

FIG. 2 depicts a posterior view of the apparatus depicted in FIG. 1.

FIG. 3 depicts a right side view of the apparatus depicted in FIG. 1.

FIG. 4 depicts a right side view of an alternative embodiment of the apparatus depicted in FIG. 1.

FIG. 5 depicts a right side view in partial cross-section of the apparatus depicted in FIG. 1.

FIG. 6 depicts a posterior partial cut-away view of the apparatus depicted in FIG. 1.

DETAILED DESCRIPTION

Figure 7:
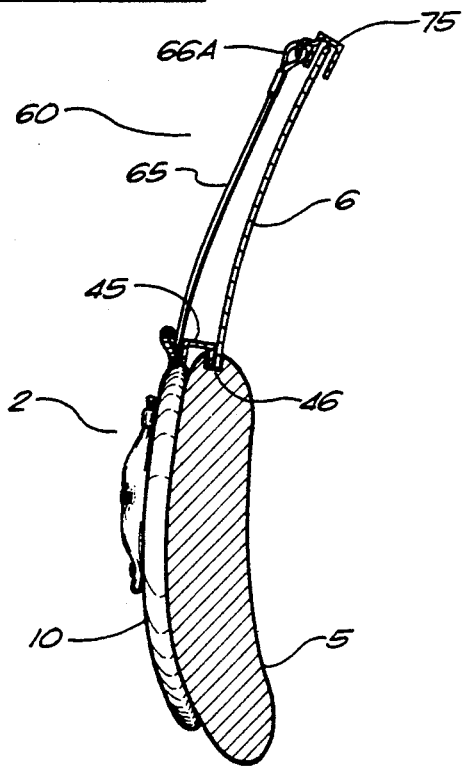
FIG. 7 depicts a side view of an embodiment of the present invention with alternative window attachment means.

FIG. 1 depicts a frontal perspective view of a preferred embodiment of apparatus 2 for elimination of vehicle door dents, dings, and scratches in accordance with the present invention. More particularly, there is shown padding portion 10 releasably attached to exterior surface 4 of vehicle door 5. Pocket 50 is fixedly attached to the top surface of padding portion 10, which also has handle 15. Securing portion 60 is attached to vehicle window 6 and communicates with padding portion 10 through conventional coated cable 65.

It should be clear to those skilled in the art that the present invention depicted in FIG. 1 covers substantially all of the portion of vehicle door exterior surface 4 which is typically susceptible to receiving unwelcome but predictable dents, dings, and scratches in parking lots and the like. In particular, padding portion 10 provides a protective barrier for vehicle door 5, thereby preventing the contacting thereof by the door of another vehicle.

Now referring to FIG. 2, there is depicted a posterior view of an apparatus embodying the present invention. Padding portion 10 of apparatus 2 preferably adheres to external metallic surface 4 of door 5 by a plurality of magnetic strips 18 A-F shown disposed longitudinally within padding portion 10. These magnetic strips, which may be arranged in any directions and configured in any combination of sizes and shapes, are preferably weaved in waterproof fabric 16. As is well known in the art, the strength of the magnetic field of such magnetic strips may be selected to enable the weight of padding portion 10 to be sustained in a vertical orientation on exterior vehicle door surface 4.

Now referring to FIGS. 2 and 3, there is also shown window-locking portion 60 which releasably secures apparatus 2 to window 6 and, of course, prevents the theft thereof. Of course, cable 65 is released from securing portion 60 by simply unlocking lock 80. In particular, cable 65 is releasably interconnected with body portion 75 of window-locking device by inserting lock 80 thereof through loop portion 66A of cable 65. Loop portion 66A is secured to cable 65 by clamp 63. Suction cup portion 70 of window-locking portion 60 maintains its position on window 6. In this preferred embodiment of the present invention, the cable withstood attempts to sever it with commonly available bolt-cutting devices, and the securing apparatus, when locked, was unable to be removed from window 6 by humanly-applied pulling, prying, and even scraping forces.

Now referring to FIGS. 5 and 6, there is seen the preferred construction of padding portion 10. More particularly, padding portion 10 comprises an inner foam layer 12 which cushions impacts to door surface 4 and is totally encased by plastic-wrap layer 14, which is, in turn totally encased by preferably waterproof fabric layer 16, which is, in turn, totally encased by outer upholstery layer 20. As hereinbefore described, fabric layer 16 includes magnetic strips preferably woven therein. Foam layer 12 and plastic wrap layer 14 are fixedly attached to each other, preferably with glue.

Inner foam layer 12 consists of flexible foam padding and the like, and should preferably be waterproof and of thickness in the range 1 to 3 inches. Plastic wrap layer 14 consists of preferably transparent or translucent wrap approximately 2-5 mils thickness and serves as a covering for the cushioning foam layer 12, for flexibility and containment of the cushioning foam layer. This composite dual layer, i.e., the joinder of foam layer 12 and plastic-wrap layer 14, is totally encased with a preferably vinyl upholstery layer 20 for protection of plastic-wrap layer 14 and aesthetic purposes. Upholstery layer 20 may be secured to fabric layer 16 with glue, tape, or stitching.

Still referring to FIGS. 5 and 6, there is also seen the manner of anchoring cable 60 within the body of padding portion 10. In particular, hole 30 is drilled vertically in foam layer 12 to accommodate flexible tubing 25 which passes therethrough. Cable 60 with circumferential flexible tubing 25 is anchored to pad portion 10 by loop 66B being received by bolt 35, disposed perpendicularly of cable 60. In particular, hole 48 is cut transversely of hole 30, to enable bolt 35, nut 36, and washer 37 to cooperate to receive loop portion 66B. Thus, bolt 35, disposed abuttably in hole 48, passes through loop portion 66B and then receives corresponding washer 37 and nut 36. Clamp 63 sustains the configuration of loop portion 66B. Plug portion 40, which was cut from pad portion 10 to create transverse hole 48, is inserted thereinto and secured with glue. Thus, coated cable 65 is fixedly secured to padding portion 10 by being integrated therewith.

Referring to FIG. 4, there is depicted an alternate embodiment of the present invention which is intended for vehicles which do not afford a metallic surface or which are so contoured that the magnetic strips of the preferred embodiment do not enable sufficient adherence of the door dent elimination apparatus. Thus, one or more metal or plastic clamps 45 may be integrated into the hereinbefore described composite padding layers, in a manner similar to the magnetic strips, and then each such clamp may be conveniently inserted into continuous gap 46 formed at the top portion of a conventional vehicle door panel, anywhere along the track-like sealing strip which, of course, retractably receives the window. Thus, regardless of whether the window is retracted into or extended from its adjacent door panel, the clamps may be securely but releasably affixed to this gap anywhere along the track.

Figure 10:
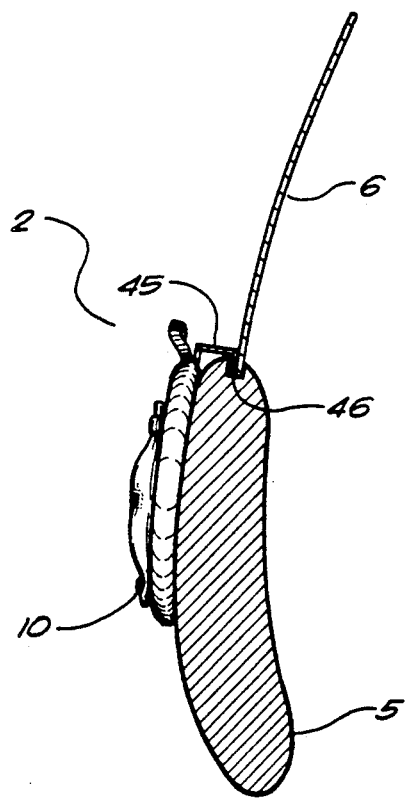
FIG. 10 depicts a side view of another apparatus embodying the present invention.

As should be apparent to those skilled in the art, embodiments of the present invention may be constructed to accommodate the curvature and appurtenances of virtually any vehicle. Instead of covering the substantial portion of a vehicle door, for example, embodiments of the present invention may be constructed to cover only the top portion of a door. FIG. 10 depicts a side view of an embodiment of the present invention in which only the top portion of a door is protected. As another example, embodiments of the present invention may be configured to accommodate side-view mirrors, door handles, keyless entry panels, and the like.

Figure 8:
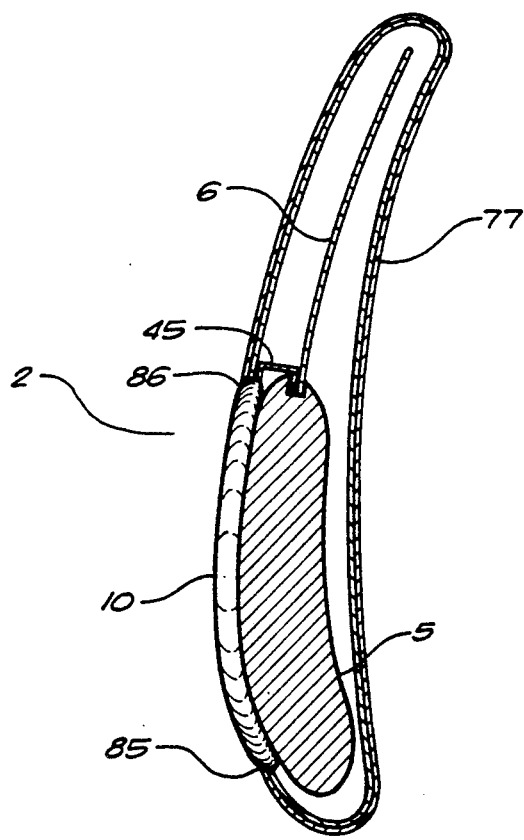
FIG. 8 depicts a side view of an embodiment of the present invention with alternative attachment means.
Figure 9:
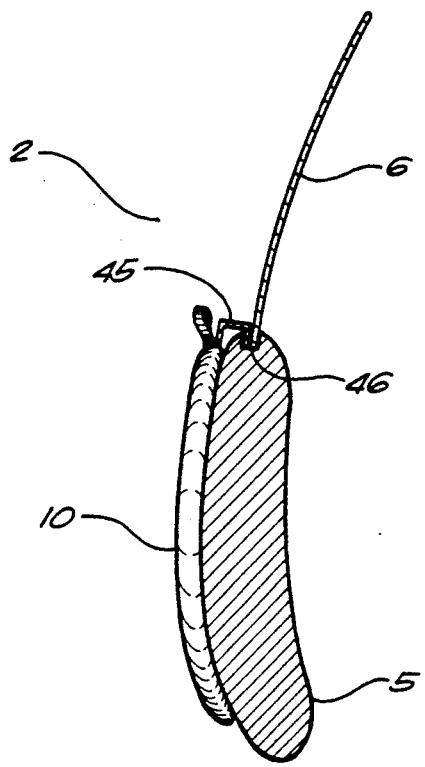
FIG. 9 depicts a side view of another apparatus embodying the present invention.

FIGS. 7, 8, and 9 depict embodiments of the present invention constructed with alternative means of attachment thereto to either a vehicle window or door. More particularly, FIG. 7 depicts a side view of an embodiment of the present invention whereby securing portion 60 is releasably attached to window 6 by looped metal or plastic latch 75. As is clearly seen, looped latch 75 is constructed to be abuttably received by the top lateral edge of window 6. In FIG. 8, there is seen an embodiment of the present invention in which attachment to door 5 and window 6 is accomplished by elastic strap 77. More particularly, apparatus for elimination of vehicle door dents 2 is releasably attached to the vehicle door by stretching and wrapping elastic strap 77 longitudinally around window 6 and door frame 5. Elastic strap 77 is fixedly stitched onto padding portion 10 at top and bottom positions 85 and 86, respectively. The embodiments depicted in FIGS. 7 and 8 should preferably be attached to window 6 after window 6 is partially open by being recessed into door frame 5. Thus, referring to FIG. 8, after window 6 is partially opened, strap 77 is circumscribed around the combination of window 6 and door 5. Similarly, referring to FIG. 7, after window 6 is partially opened, latch 75 is abuttably received by the top edge of window 6. FIG. 9 depicts still another embodiment of the present invention in which padding portion 10 is secured to door 5 solely by snugly inserting clamp 45 into gap 46 formed at the top portion of door 5's panel, along the longitudinal track which conventional receives retractable window 6. In particular, FIG. 9 depicts an inexpensive embodiment of the present invention which has only a padding portion. Indeed, the padding portion may consist merely of an inner foam layer covered by a single outer layer of waterproof material and the like. The incorporation of magnetic strips therein, as hereinbefore described, is optional. In addition to being inexpensive, this embodiment is especially lightweight and easy to apply.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. In a vehicle having a plurality of doors with windows, an apparatus for elimination of dents to an external surface of at least one of said doors, said apparatus comprising:
   padding means having cushioning means and a plurality of layering means, said padding means configured to be releasably received by said external surface of said one door, and disposed longitudinally thereof;
   said layering means comprising:
      an inner plastic wrap layer fixedly attached to and totally encasing said cushioning means for containment of said cushioning means;
      at least one intermediate fabric layer fixedly attached to and totally encasing said inner plastic wrap layer for protection of said inner plastic wrap layer; and
      an outer upholstery layer fixedly attached to and totally encasing said intermediate fabric layer for protection of said intermediate fabric layer and for aesthetics; and
   securing means fixedly attached to said padding means for sustaining a medial disposition of said securing means between said padding means and said external surface of said one door.

2. The apparatus claimed in claim 1, wherein said cushioning means comprises foam means.

3. The apparatus claimed in claim 1, wherein said intermediate fabric layer comprises a plurality of magnetic strips disposed fixedly and longitudinally therein for attraction thereof to said external surface of said one door.

4. In a vehicle having a plurality of doors with windows, an apparatus for elimination of dents to an external surface of at least one of said doors, said apparatus comprising:
   padding means having foam means and a plurality of layering means, said padding means configured to be releasably received by said external surface of said one door, and disposed longitudinally thereof;
   said layering means comprising an outer fabric layer fixedly attached to said foam means, an inner plastic wrap layer fixedly attached to and totally encasing said foam means for containment of said foam means, at least one intermediate fabric layer fixedly attached to and totally encasing said inner plastic wrap layer for protection of said inner plastic wrap layer, and an outer upholstery layer fixedly attached to and totally encasing said intermediate fabric layer for protection of said intermediate fabric layer and for aesthetics; and
   securing means fixedly attached to said padding means for sustaining a medial disposition of said securing means between said padding means and said external surface of said one door.

5. The apparatus claimed in claim 4, wherein said intermediate fabric layer comprises a plurality of magnetic strips disposed fixedly and longitudinally therein for attraction thereof to said external surface of said one door.

6. In a vehicle having a plurality of doors with windows, an apparatus for elimination of dents to an external surface of at least one of said doors with a window, said apparatus comprising:
   padding means having cushioning means and a plurality of layering means, said padding means configured to be releasably received by said external surface of said one door, and disposed longitudinally thereof;

securing means fixedly attached to said padding means for sustaining a medial disposition of said securing means between said padding means and said external surface of said one door; and cable means fixedly attached on one end to anchor means contained within said padding means and releasably attached on another end which is opposite and remote from the one end thereof to a portion of said one window of said one door, for preventing said padding means from being forcibly removed from said one door.

7. The apparatus claimed in claim 6, wherein said cushioning means comprises foam means.

8. The apparatus claimed in claim 6, wherein said layering means comprises an outer fabric layer fixedly attached to and totally encasing said cushioning means.

9. The apparatus claimed in claim 6, wherein said layering means comprises:
an inner plastic wrap layer fixedly attached to and totally encasing said cushioning means for containment of said cushioning means;
at least one intermediate fabric layer fixedly attached to and totally encasing said inner plastic wrap layer for protection of said inner plastic wrap layer; and
an outer upholstery layer fixedly attached to and totally encasing said intermediate fabric layer for protection of said intermediate fabric layer and for aesthetics.

10. The apparatus claimed in claim 9, wherein said intermediate fabric layer comprises a plurality of magnetic strips disposed fixedly and longitudinally therein for attraction thereof to said external surface of said one door.

11. The apparatus claimed in claim 6, wherein said cable means further comprises adhering means for attaching said remote end thereof to said one window of said one door.

12. The apparatus claimed in claim 6, wherein said padding means further includes pocket means fixedly attached thereto and disposed adjacent the external surface thereof.

13. In a vehicle having a plurality of doors with windows, an apparatus for elimination of dents to an external surface of at least one of said doors with a window, said apparatus comprising:

padding means having foam means and a plurality of layering means, said padding means configured to be releasably received by said external surface of said one door, and disposed longitudinally thereof;

said layering means comprising an outer fabric layer fixedly attached to said foam means, an inner plastic wrap layer fixedly attached to and totally encasing said cushioning means for containment of said foam means, at least one intermediate fabric layer fixedly attached to and totally encasing said inner plastic wrap layer for protection of said inner plastic wrap layer, and an outer upholstery layer fixedly attached to and totally encasing said intermediate fabric layer for protection of said intermediate fabric layer and for aestetics;

said intermediate fabric layer comprising a plurality of magnetic strips disposed fixedly and longitudinally therein for attraction thereof to said external surface of said one door;

securing means fixedly attached to said padding means for sustaining a medial disposition of said securing means between said padding means and said external surface of said one door; and cable means fixedly attached on one end to anchor means contained within said padding means and releasably attached on another end which is opposite and remote from the one end thereof to a portion of said one window of said one door, for preventing said padding means from being forcibly removed from said one door.

14. The apparatus claimed in claim 13, wherein said cable means further comprises adhering means for attaching said remote end thereof to said one window of said one door.

15. The apparatus claimed in claim 14, wherein said adhering means comprises locking means releasably interconnected with said cable means and suction means for pressurized attachment thereof to said one window of said one door.

16. The apparatus claimed in claim 13, wherein said anchor means comprises:
a first hole cut substantially midway through said foam means and disposed longitudinally thereof;
said first hole configured to abuttably receive said cable means therethrough; and
a second hole cut axially through said foam means and substantially perpendicularly of said first hole, configured to abuttably receive fastener means for being fixedly attached to loop means disposed on said one end of said cable means.

17. The apparatus claimed in claim 13, wherein said padding means further includes pocket means fixedly attached thereto and disposed adjacent the external surface thereof.

* * * * *